ns
3,049,513
ORDERED ISOCYANATE-TERMINATED POLY-
ETHER-BASED URETHANE COMPOSITIONS
Adolfas Damusis, Detroit, and Kurt C. Frisch, Grosse Ile,
  Mich., assignors to Wyandotte Chemicals Corporation,
  Wyandotte, Mich., a corporation of Michigan
  No Drawing.  Filed Mar. 26, 1959, Ser. No. 802,008
                18 Claims.  (Cl. 260—77.5)

The present invention relates to novel ordered isocyanate-terminated polyether-based urethane compositions which are especially useful as the isocyanate-terminated urethane component of one package polyisocyanate surface coatings, for example, air drying polyurethane coatings, or as one component along with a hydroxy-terminated component in two-component polyurethane coatings or corresponding one package systems in which they are employed in a blocked form along the hydroxy-terminated component. The compositions of the invention are of especial utility in one-component isocyanate-terminated urethane coating compositions in which they are the sole polyurethane-forming component, the necessary second reactant being provided by moisture from the air.

It is an object of the present invention to provide novel isocyanate-terminated components for urethane coatings. It is a further object to provide novel and valuable ordered isocyanate-terminated urethane components for polyurethane coatings systems. A further object is the provision of such compositions which are polyether-based urethanes. Another object is the provision of such ordered urethane compositions which lend advantageous properties to polyurethane coatings in which they are employed as the isocyanate-terminated component or ingredient. Still another object of the invention is the provision of a process for the production of such ordered urethane compositions sequentially by the reaction of about one molar proportion of a selected polyether polyol with about one molar proportion of a selected arylene diisocyanate for each hydroxy group of the polyether polyol, and reaction of about two molar proportions of the thus-produced isocyanate-terminated urethane with about one molar proportion of a selected polypropyleneether glycol, and the products thereby produced. Other objects of the invention will become apparent hereinafter.

The foregoing and additional objects are accomplished by the provision of ordered isocyanate-terminated urethane compositions (U) of the following idealized formula:

(Formula A)

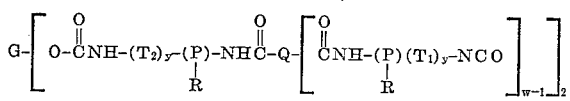

wherein R is selected from hydrogen and methyl, wherein G together with the adjacent two oxygen atoms is the radical of a polypropyleneether glycol (c) having a molecular weight between about 134 and 1000, wherein

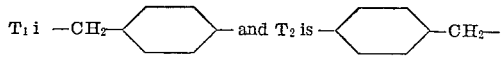

wherein y is a number from zero to one, inclusive, wherein P is phenyl, and wherein Q is the same in both occurrences and is the radical of a polyether polyol (a) having a number w of terminal hydroxy groups which is a propylene oxide addition product of a lower alkanol containing at least three and not more than six hydroxy groups per molecule, and wherein w−1 is a number from two to five, inclusive, corresponding to the number of the hydroxy groups (minus one) of the polyether polyol (a), said urethane composition (U) being prepared sequentially by the reaction of about one molar proportion of polyether polyol (a) with about one molar proportion of arylene diisocyanate (b) selected from the group consisting of phenylene diisocyanate, tolylene diisocyanate, and diphenylmethane-4,4'-diisocyanate for each hydroxy group of the polyether polyol (a), to produce an isocyanate-terminated polyether polyol based urethane (I), and subsequent reaction of two molar proportions of the isocyanate-terminated urethane (I) with about one molar proportion of the selected polypropyleneether glycol (c).

The ordered hydroxy-terminated urethane compositions of the present invention have certain advantages over ordinary isocyanate-terminated materials intended for the same purposes. While equivalent weight and chemical composition are important considerations, the ordered formation of the isocyanate-terminated urethanes of the present invention is of greatest importance in the attainment of desirable properties in surface coatings embodying the same, and desired film properties can be obtained with facility by merely changing their structure slightly within the scope of the invention in a predetermined manner. Polyurethane coatings prepared from the products of the invention by reaction with a selected hydroxy-terminated component dry to touch upon evaporation of solvent. When the ordered isocyanate-terminated urethane compositions of the present invention are reacted with a hydroxy-terminated component, the resulting polyurethane surface coatings are characterized by properties which are superior to those obtained from the same hydroxy component and previously used isocyanate components, although it must be recognized that in two-component systems to a considerable extent film properties can be adjusted by judicious selection of the hydroxy-bearing component. The same considerations and advantages apply when the products of the invention are employed as one ingredient of a one package surface coating composition in their blocked form together with an hydroxy-bearing material as the other ingredient (for example, in baking enamels or wire coatings). The advantages are also found to exist for polyurethane surface coatings prepared from the ordered NCO-terminated urethane compositions of the invention as opposed to those prepared from random NCO-terminated urethane reaction products, compared to which latter a higher solid content at lower viscosity can be attained in surface coatings embodying the ordered NCO-terminated urethane compositions of the invention.

The ordered NCO-terminated urethane compositions of the present invention are prepared by reacting about one molar proportion of polyether polyol (a) with about one molar proportion of an appropriate arylene diisocyanate (b), selected from phenylene diisocyanate, 2,4-tolylene diisocyanate, 2,6-tolylene diisocyanate, including mixtures of 2,4 and 2,6 tolylene diisocyanates, and diphenylmethane-4,4'-diisocyanate, for each hydroxy group of the polyether polyol (a), to produce an isocyanate-terminated urethane having a free NCO group at each terminus of the molecule. If desired, partly one diisocyanate and partly another diisocyanate may be used. About two molar proportions of this isocyanate-terminated urethane adduct (I) are then reacted with about one molar proportion of the selected polypropyleneether glycol (c) of selected molecular weight between about 134 and 1000 to produce an ordered NCO-terminated urethane composition in which two molecules of isocyanate-terminated intermediate I are joined or extended by the polypropyleneether glycol (c) molecule.

Intermediate I, therefore, the reaction product of polyether polyol (a) and diisocyanate (b), has the idealized structure:

(Formula B)

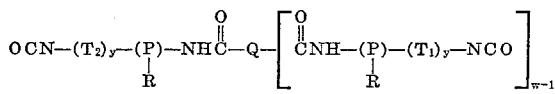

wherein Q is the radical of a polyether polyol (a) having w hydroxy groups and wherein the remaining symbols have the same significance as given hereinbefore, and upon reaction with the polypropyleneether glycol (c), the product is that given under Formula A hereinbefore.

The polyether polyol (a) used in the first stage of the sequential reaction is a propylene oxide addition product of a lower alkanol, containing up to and including ten carbon atoms and containing at least three and not more than six hydroxy groups per molecule, and may be represented by the formula:

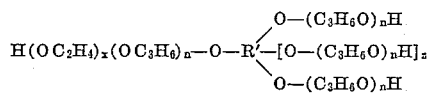

wherein R' with attached oxygen atoms represents a lower-alkanol radical, $n$ is a number from one to five, inclusive, $z$ is a number from zero to three, inclusive, and $x$ is a number from zero to one, inclusive. Representative polyether polyols encompassed by this formula include the addition products of glycerine, hexanetriol, and trimethylolpropane with from three to fifteen moles of propylene oxide, the addition products of such polyols further reacted with one mole of ethylene oxide, the addition product of pentaerythritol with from four to twenty moles of propylene oxide, the addition products of such polyols further reacted with one mole of ethylene oxide, the addition product of dipentaerythritol or sorbitol with from six to thirty moles of propylene oxide, the addition products of such polyols further reacted with one mole of ethylene oxide, and the like. The terminal ethylene oxide unit, when added to the polyoxypropylene chain or unit, provides a primary hydroxy group of relatively high reactivity for definite direction and precedence of reaction with NCO groups in preparing the intermediate NCO-terminated urethane (I).

It will be obvious from the foregoing definition of the polyether polyol (a) that the formula for the radical Q is as follows:

(Formula C)

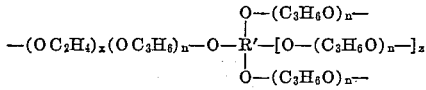

wherein $z$ is a number from zero to three inclusive, and wherein the number of unsatisfied bonds formed by removal of terminal hydrogen atoms in this molecule is from 3 to 6, inclusive, which may be represented by the number $w$. Thus, in foregoing Formula A, the one bond having already been satisfied by reaction with a diisocyanate, the remaining unsatisfied bonds are satisfied by reaction with a diisocyanate to the extent $w-1$.

In practice, the molecular weights of the ordered isocyanate-terminated urethane compositions of the invention, prepared in this sequential manner, have been found to be very close to the molecular weight of a composition having an idealized structure, since very little polymerization occurs using predetermined molar proportions and the sequential addition procedure under moderate reaction conditions, viz. initial reaction temperatures below about 60° C. and absence of moisture. Also, in practice, a chain length of not greater than about 750, and preferably about 300 to 400, molecular weight has been found most advantageous for the polypropyleneether glycol (c), and a polyether polyol having no more than an average of about two propylene oxide units added per individual chain of starting polyol is preferred for an NCO-terminated urethane to be used in two-component systems or in its blocked form, while polyether polyols having up to and including five propylene oxide units per individual chain are preferably used in one package urethane coatings systems which employ only the isocyanate-terminated component. When the polyether polyol (a) employed has four or more hydroxy groups, the polypropyleneether glycol (c) preferably has a molecular weight greater than about 400. As for the isocyanate employed, tolylene diisocyanate, usually a mixture of about 80%/20% of the 2,4 and 2,6 isomers, is preferred for reasons of economy. Other variations in the starting materials to procure variations in the substituents of the ordered NCO-terminated urethane compositions may be usefully made to obtain polyurethane surface coatings of varying types and characteristics upon reaction with a selected hydroxy-bearing component. For example, lengthening of the polyoxypropylene chains shown in the above formulae results in a polyurethane coating having a longer pot life, greater flexibility, and lower solvent resistance, while shortening of these polyoxypropylene chains has just the opposite effect. Flexibility of such coatings can, for example, be readily adjusted by changing the length of the polyoxypropylene chain or chains, either in the polypropyleneether glycol (c) or in the polyether polyol (a) or both if desired. The preferred isocyanate group equivalent weight of the NCO-terminated urethanes of the present invention is between about 400 and 600, although for single isocyanate-terminated component air-drying coating application the equivalent weight may in some cases be even as high as 800.

The following examples are given to illustrate the present invention but are not to be construed as limiting.

GENERAL PROCEDURE

Ordered isocyanate-terminated urethanes, such as NCO-2 of Example 1, are prepared in two stages. The adduct (I) of polyether polyol (a) and the selected diisocyanate (b) is prepared in the first stage at an equivalent ratio of NCO/OH of about 2/1 and contains terminal free NCO groups, only half of the NCO groups taking part in the reaction. In this stage, moisture and temperature conditions must be controlled carefully.

In the second stage, two molar proportions of adduct (I) are reacted with one molar proportion of polypropyleneether glycol (c) in order to form an NCO-terminated urethane with two I moieties, one on each end of the glycol (c) molecule. The addition of one glycol molecule to two of the adduct (I) changes the NCO/OH ratio to 1.7/1 to 1.5/1, depending on the polyether polyol (a) used in making adduct (I).

Dilution of the NCO-terminated intermediate at the end of stage 1 may be made with any suitable nonreactive surface coating solvent. Many such solvents suitable in general for urethane coatings and components thereof are known in the art, for example, 2-ethoxyethyl acetate, 2-methoxyethyl acetate, 2-butoxyethyl acetate, toluene, xylene, ethyl acetate, butyl acetate, amyl acetate, other similar esters, ketones, chlorinated solvents, nitro-aliphatic solvents, dioxane, and the like. In some instances no solvent is required during any stage of the reaction.

Polyether polyols used in the reaction are preferably stripped of water by azeotropic distillation with toluene or by vacuum drying. In this manner, the amount of water can be decreased from 0.08–0.15 to 0.02% or even less. A clean, dry, three-necked five-liter flask was used as a reaction vessel, and a nitrogen blanket was maintained over the reactants.

Example 1

(NCO-2)

| Reactants | Molar proportions | | |
|---|---|---|---|
| | Moles | Parts | Weight, Percent |
| Tolylene diisocyanate, TDI (80/20; 2,4/2,6) | 6 | 1,044 | 36.6 |
| Polyoxypropylene derivative of trimethylolpropane, Pluracol TP-440 (M.W. 410) | 2 | 822 | 28.7 |
| Dipropylene glycol, DPG (M.W. 134) | 1 | 134 | 44.7 |
| 2-ethoxyethyl acetate (urethane grade) | | 429 | 15.0 |
| Xylene | | 429 | 15.0 |
| | | 2,858 | 100.0 |

NOTE.—Ratio of reactive groups: NCO/OH=1.5/1.

PREPARATION OF NCO-2

Stage 1.—1044 parts of tolylene diisocyanate (TDI) are charged into a 5-liter reaction flask under a nitrogen blanket and 822 parts of Pluracol TP-440 are gradually added thereto with stirring. The temperature is kept below 50° C. by cooling the vessel with cold water or by controlled addition of Pluracol TP-440 to the TDI. After the exothermic reaction is finished, the contents are heated at 50° C. for at least one hour. The adduct is diluted to 85% solids with 180 parts 2-ethoxyethyl acetate and 180 parts xylene. The abbreviated formula of the adduct I at this stage is:

TP-440 the circles representing the diisocyanate molecules, urethane linkages being omitted.

Stage 2.—134 parts of dipropylene glycol are gradually added to the adduct I. The batch is heated to 70° C. for 3 hours, whereafter the reaction product is diluted to 70% solids with 249 parts of 2-ethoxyethyl acetate and 249 parts xylene. The product U at this point has the abbreviated formula:

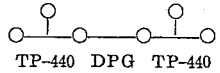
TP-440  DPG  TP-440

The resulting solution is poured into a clean dry bottle and tightly capped to exclude moisture.

Properties of NCO-2:
```
  NCO/OH _____ 1.5/1.0
  Average molecular weight (calc.) _____ 2000
  Average equivalent weight per —NCO
    group _____ 500
  Theoretical, cal., —NCO, percent _____ 8.4
  Measured —NCO, percent _____ 8.2–8.3
  TDI on solid basis, percent _____ 52.2
Properties of NCO-2 solution:
  Nonvolatile, percent _____ 70
  Weight per gallon, lb. _____ 9.03
  Brookfield viscosity at 25° C., cps. _____ 2000–4000
  Measured —NCO, percent, on 70%
    solid basis _____ 5.75–5.82
```

NCO-2 in urethane coatings: Three typical urethane coating formulations are presented here: (1) two component cured with a hydroxy-terminated intermediate, (2) two component cured with a polyol, (3) one component cured with moisture.

URETHANE COATINGS WITH NCO-2

| | Formulation | | |
|---|---|---|---|
| | 1 | 2 | 3 |
| COMPOSITION | | | |
| Isocyanate-terminated intermediate. | NCO-2 | NCO-2 | NCO-2. |
| Parts | 100 | 100 | One component. |
| Curing agent | OH-1 [1] | Pluracol TP-440. | Moisture. |
| Parts | | 22 | |
| NCO/OH | 1.2/1.0 | 1.2/1.0 | |
| PROPERTIES | | | |
| Curing Time: | | | |
| Dust free, hr | 2.0 | 1.4 | 0.75. |
| Dry to touch, hr | 3.5 | 2.75 | 2.40. |
| Pot life, hr | 40 | 54 | Over 6 mo. |
| Sward hardness | 20–30 | 36–46 | 48. |
| Elongation, percent | 50–70 | 20–40 | 20. |
| Tensile strength, p.s.i | 3000–4000 | 3200–6600 | 4800. |
| Impact test—Gardner, inch-lb.: | | | |
| Direct | >30 | 24–30 | 18–24. |
| Indirect | >30 | 20–24 | 6–10. |
| Abrasion resistance, mg./1,000 cycles. | | 40 | 20. |
| Chemical resistance, hr | Excellent | Excellent | Excellent. |
| Solvent resistance, hr.: | | | |
| Toluene | >4 | >4 | >4. |
| 2-Ethoxyethyl acetate | 3 | >4 | >4. |
| Methyl isobutyl ketone | 3 | 3 | >4. |
| Water resistance: | | | |
| 24 hr. immersion, 25° C | No effect | No effect | No effect. |
| ½ hr. immersion, 100° C | do | do | Do. |
| Weatherometer test, 500 hr | No loss of gloss. | No loss of gloss. | No loss of gloss. |

[1] OH-1 is the reaction product of two moles of Pluracol TP-440 with one mole of TDI.

Example 2

(NCO-3)

| Reactants | Molar proportions | | |
|---|---|---|---|
| | Moles | Parts | Weight, Percent |
| Tolylene diisocyanate, TDI (80/20; 2,4/2,6) | 6 | 1,044 | 32.0 |
| Polyoxypropylene derivative of trimethylolpropane, Pluracol TP-440 (M.W. 410). | 2 | 822 | 25.2 |
| Polypropyleneether glycol, Pluracol P-410 (M.W. 420). | 1 | 420 | 12.8 |
| 2-ethoxyethyl acetate (urethane grade) | | 490 | 15.0 |
| Xylene | | 490 | 15.0 |
| | | 3,266 | 100.0 |

NOTE.—Ratio of reactive groups NCO/OH=1.5/1.

PREPARATION OF NCO-3

Stage 1.—1044 parts tolylene diisocyanate are charged into a 5-liter reaction flask under a nitrogen blanket. 822 parts of Pluracol TP-440 are gradually added with stirring. The temperature is kept below 50° C. After the exothermic reaction is finished the contents are heated at 50° C. for at least one hour, whereafter the adduct is diluted with 200 parts of 2-ethoxyethyl acetate and 200 parts xylene. The abbreviated formula of the Adduct I at this stage is:

TP-440 the circles representing the diisocyanate molecules, urethane linkages being omitted.

Stage 2.—420 parts of polypropyleneether glycol are gradually added to the adduct. The batch including added Pluracol P-410 is heated to 70° C. for 3 hours, whereafter the reaction product is diluted to 70% solids with 290 parts of 2-ethoxyethyl acetate and 290 parts of xylene.

The resulting intermediate solution is poured into a clean dry bottle and tightly capped to exclude moisture. The product U at this point has the abbreviated formula:

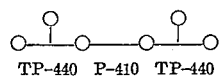

TP-440   P-410   TP-440

Properties of NCO-3:
  NCO/OH _____ 1.5/1.0
  Average molecular weight (calc.) _____ 2286
  Average equivalent weight per —NCO group __ 571
  Theoretical —NCO, calc., percent _____ 7.3
  Measured —NCO, percent _____ 6.8–7.1
  TDI on solid basis, percent _____ 45.5

Properties of NCO-3 solution:
  Nonvolatile, percent _____ 70
  Weight per gallon, lb. _____ 9.08
  Brookfield viscosity at 25° C., cps. ____ 3000–6000
  Measured —NCO, percent, on 70% solid basis _____ 4.8–5.0

NCO-3 in urethane coatings: Three typical urethane coating formulations are presented here: (1) two component cured with a hydroxy-intermediate, (2) two component cured with a polyol, (3) one component cured with moisture.

PREPARATION OF NCO-3A

The preparation procedure is identical to the preparation of Example 2. At the end of Stage 1, Intermediate I has the abbreviated formula:

P-368T the circles representing the diisocyanates molecules, urethane linkages being omitted.

At the end of Stage 2, the reaction product has the abbreviated formula:

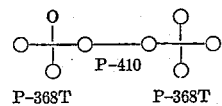

P-368T     P-368T

Properties of NCO-3A:
  NCO/OH _____ 1.6/1.0
  Average molecular weight, calc. _____ 2548
  Average equivalent weight per —NCO group __ 425
  Theoretical —NCO, calc., percent _____ 9.6
  Measured —NCO, percent _____ 9.57

URETHANE COATINGS WITH NCO-3

|  | Formulation | | | |
|---|---|---|---|---|
|  | 4 | 5[1] | 6 | 7 |
| COMPOSITION | | | | |
| Isocyanate-terminated intermediate | NCO-3 | NCO-3 | NCO-3 One component | NCO-3. |
| Parts | 100 | 100 |  | 100. |
| Curing agent | OH-1 | TP-440 + quadrol[2] | Moisture | OH-3[3]. |
| Parts | 62 | 10 |  | 30. |
| NCO/OH | 1.2/1.0 | 1.2/1.0 |  | 2.0/1.0. |
| PROPERTIES | | | | |
| Curing time: | | | | |
|   Dust free, hr | 2.0 | 1.2 | 0.8 | 0.7. |
|   Dry to touch, hr | 3.0 | 2.0 | 2.5 | 1.2. |
| Pot life, hr | 42 | 40 | Over 6 mo | 2.0. |
| Sward hardness | 16–20 | 32–40 | 40–46 | 60–62. |
| Elongation, percent | 100–240 | 10–16 | 40–60 | 20–40. |
| Tensile strength, p.s.i | 2,600–3,600 | 3,200–4,600 | 5,200 | 5,000–8,000. |
| Impact test—Gardner, inch-lb.: | | | | |
|   Direct | Over 30 | 16–20 | Over 30 | Over 30. |
|   Indirect | do | 4–8 | 24–28 | 20–24. |
| Abrasion resistance, mg | | 46 | 29 | 18. |
| Chemical resistance | Excellent | Excellent | Excellent | Excellent. |
| Solvent resistance, hr.: | | | | |
|   Toluene | >4 | >4 | >4 | >4. |
|   2-ethoxyethyl acetate | 2 | 3 | 3 | >4. |
|   Methyl isobutyl ketone | 1½ | 3 | 3 | >4. |
| Water resistance: | | | | |
|   Immersion, 24 hr. 25° C | No effect | No effect | No effect | No effect. |
|   Immersion, ½ hr. 100° C | do | do | do | Do. |
| Weatherometer test, 500 hrs | No loss of gloss | No loss of gloss | No loss of gloss | No loss of gloss. |
| Sagging | Nonsagging | Some sagging | Slight sagging | No sagging. |

[1] TP-440 and Quadrol are in equimolar proportion.
[2] Quadrol is a registered trademark for the Wyandotte Chemicals Corporation brand of N,N,N',N'-tetrakis (2-hydroxypropyl) ethylene diamine.
[3] OH-3 consists of one mole of Pluracol P-410, reacted with two moles of TDI, the product being subsequently reacted with two moles of Quadrol.

*Example 3*

(NCO-3A)

| Reactants | Molar proportions | | |
|---|---|---|---|
|  | Moles | Parts | Weight, percent |
| Tolylene diisocyanate, TDI (80/20· 2,4/2,6) | 8 | 1,392 | 32.8 |
| Polyoxypropylene derivative of pentaerythritol P-368T (M.W. 360) | 2 | 736 | 17.3 |
| Polypropyleneether glycol, Pluracol P-410 (M.W. 420) | 1 | 420 | 9.9 |
| 2-ethoxyethyl acetate (urethane grade) |  | 851 | 20.0 |
| Xylene |  | 851 | 20.0 |
|  |  | 4,250 | 100.0 |

NOTE.—Ratio of reactive groups: NCO/OH=1.6/1.0.

Properties of NCO-3A solution:
  Nonvolatile, percent _____ 70
  Weight per gallon, lb. _____ 9.17
  Brookfield viscosity at 25° C., cps. ____ 8000–12,000
  Measured —NCO, percent, on 70% solid basis _____ 6.7

NCO-3A in urethane coatings: Two typical urethane coating formulations are presented here: (1) two component cured with a hydroxy-terminated intermediate, (2) one component cured with moisture.

URETHANE COATINGS WITH NCO-3A [1]

| | Formulation | |
|---|---|---|
| | 8 | 9 |
| COMPOSITION | | |
| Isocyanate-terminated intermediate | NCO-3A | NCO-3A, one component. |
| Parts | 150 | |
| Curing agent | OH-2A [2] | Moisture. |
| Parts | 100 | |
| NCO/OH | 2.0/1.0 | |
| PROPERTIES | | |
| Curing time: | | |
| Dust free, hr | 1.0 | 1.0. |
| Dry to touch, hr | 1.2 | 1.5. |
| Pot life, hr | 28 | Over 6 mo. |
| Sward hardness | 58–70 | 80–90. |
| Elongation, percent | 8–10 | 8–10. |
| Impact test—Gardner, in.-lb.: | | |
| Direct | 20–24 | 18–24. |
| Indirect | 4–8 | 4–8. |
| Chemical resistance | Excellent | Excellent. |
| Solvent resistance, hr.: | | |
| Toluene | >4 | >4. |
| Methyl isobutyl ketone | 3 | >4. |
| Water resistance: | | |
| Immersion, 24 hr. 25° C | No effect | No effect. |
| Immersion, 1/2 hr. 100° C | do | Do. |
| Weatherometer test, 500 hr | No loss of gloss. | No loss of gloss. |

[1] Numerous other hydroxyl-bearing organic compounds, such as polypropyleneether glycols, polytetramethyleneether glycols, the Desmophen-Multron series of polyesters, castor oil, and other hydroxy-terminated urethanes prepared from diisocyanates and polyols, especially polyether polyols, may be used in surface coatings as the organic hydroxy compound component along with the products of the invention, in addition to those hydroxy-bearing materials disclosed for this purpose in Examples 1 through 3.

[2] OH-2A consists of one mole of Pluracol P-410 reacted with two moles of TDI, the product being subsequently reacted with two moles PE-P-252T (propylene oxide adduct of pentaerythritol, M.W. 252).

*Example 4*

(NCO-3X)

| Reactants | Moles | Parts |
|---|---|---|
| Tolylene diisocyanate (2, 4) | 8 | 1,392 |
| Polyoxypropylene derivative of pentaerythritol—PE-368T—M.W. 368 | 2 | 736 |
| Polypropyleneether glycol, M.W. 750 | 1 | 750 |
| 2-ethoxyethyl acetate | | 961 |
| Xylene | | 961 |

Procedure: Same as in Example 2.

Properties:
  NCO/OH _____ 1.6/1
  Average molecular weight _____ 2878
  Average equivalent weight/NCO group _____ 479
  Free —NCO, percent _____ 5.25

NCO-3X in urethane surface coatings: When employed as a coatings component either alone or together with the OH-terminated components of Example 2 in the NCO/OH proportions of Example 2, NCO-3X gives hard urethane films which are more flexible but which have less solvent resistance than the films of Example 2. Chemical resistance and water immersion resistance are excellent.

*Example 5*

(NCO-3Y)

| Reactants | Moles | Parts |
|---|---|---|
| TDI (80/20; 2,4/2,6) | 8 | 1,392 |
| Polyoxypropylene derivative of pentaerythritol—PE-368T (M.W. 363) | 2 | 736 |
| Polypropyleneether glycol, P-1010—M.W. 1000 | 1 | 1,000 |
| 2-ethoxyethyl acetate | | 1,044 |
| Xylene | | 1,044 |

Procedure: Same as in Example 2.

Properties:
  NCO/OH _____ 1.6/1
  Average molecular weight _____ 3136
  Average equivalent weight _____ 522
  Free —NCO, percent _____ 4.80

NCO-3Y in urethane surface coatings: When employed as a coatings component either alone or together with the OH-terminated components of Example 2 in the NCO/OH proportions of Example 2, NCO-3Y gives hard urethane films which are more flexible but which have less solvent resistance than the films of Example 2. Chemical resistance and water immersion resistance are excellent.

*Example 6*

(NCO-3Z)

| Reactants | Moles | Parts |
|---|---|---|
| TDI (80/20; 2,4/2,6) | 12 | 2,088 |
| Polyoxypropylene derivative of dipentaerythritol—one PO unit/OH group (M.W. 620) | 2 | 1,240 |
| Polypropyleneether glycol, P-1010—M.W. 1000 | 1 | 1,000 |
| 2-ethoxyethyl acetate | | 1,446 |
| Xylene | | 1,446 |

Procedure: Same as in Example 2.

Properties:
  NCO/OH _____ 1.7/1
  Average molecular weight _____ 4300
  Average equivalent weight _____ 430
  Free —NCO, percent _____ 5.86

NCO-3Z in urethane surface coatings: When employed as a coatings component either alone or together with the OH-terminated components of Example 2 in the NCO/OH proportions of Example 2, NCO-3Z gives hard urethane films which are more flexible but which have less solvent resistance than the films of Example 2. Chemical resistance and water immersion resistance are excellent.

*Example 7*

(NCO-3P)

| Reactants | Moles | Parts |
|---|---|---|
| TDI (80/20; 2,4/2,6) | 6 | 1,044 |
| Polyoxypropylene derivative of glycerine, 2 PO units/OH group (M.W. 450) | 2 | 900 |
| Tetrapropylene glycol | 1 | 250 |
| 2-ethoxyethyl acetate | | 473 |
| Xylene | | 473 |

Procedure: Same as in Example 2.

Properties:
  NCO/OH _____ 1.5/1
  Average molecular weight _____ 2186
  Average equivalent weight/NCO group ____ 546
  Free —NCO, percent _____ 5.38

NCO-3P in urethane surface coatings: When employed as a coatings component either alone or together with the OH-terminated components of Example 2 in the NCO/OH proportions of Example 2, NCO-3P gives hard urethane films which are less flexible but which have slightly greater solvent resistance than the films of Example 2. Chemical resistance and water immersion resistance are excellent.

*Example 8*

(NCO-3D)

| Reactants | Moles | Parts |
|---|---|---|
| Phenylene diisocyanate | 6 | 936 |
| Polyoxypropylene derivative of hexanetriol, one PO unit/OH group (M.W. 320) | 2 | 640 |
| Polypropyleneether glycol, P-410—M.W. 420 | 1 | 420 |
| 2-ethoxyethyl acetate | | 427 |
| Xylene | | 427 |

Procedure: Same as in Example 2.

Properties:
    NCO/OH _____ 1.5/1
    Average molecular weight _____ 1998
    Average equivalent weight/NCO group ____ 499
    Free —NCO, percent _____ 5.9

NCO–3D in urethane surface coatings: When employed as a coatings component either alone or together with the OH-terminated components of Example 2 in the NCO/OH proportions of Example 2, NCO–3D gives hard urethane films which are less flexible but which have greater solvent resistance than the films of Example 2. Chemical resistance and water immersion resistance are excellent.

*Example 9*

(NCO–3Q)

| Reactants | Moles | Parts |
|---|---|---|
| Diphenylmethane-4,4'-diisocyanate | 12 | 3,000 |
| Sorbitol polyoxypropylene derivative 2 PO units/OH group (M.W. 900) | 2 | 1,800 |
| Polypropyleneether glycol—M.W. 750 | 1 | 750 |
| 2-ethoxyethyl acetate | | 1,860 |
| Xylene | | 1,860 |

Procedure: Same as in Example 2.

Properties:
    NCO/OH _____ 1.7/1
    Average molecular weight _____ 5506
    Average equivalent weight _____ 550
    Free —NCO, percent _____ 4.5

NCO–3Q in urethane surface coatings: When employed as a coatings component either alone or together with the OH-terminated components of Example 2 in the NCO–3Q gives hard urethane films which are more flexible but which have less solvent resistance than the films of Example 2. Chemical resistance and water immersion resistance are excellent.

*Example 10*

(NCO–3L)

| Reactants | Moles | Parts |
|---|---|---|
| Tolylene diisocyanate (80/20; 2,4/2,6) | 6 | 1,044 |
| Polyoxypropylene derivative of trimethylolpropane, 5 PO units/OH group (M.W. 1000) | 2 | 2,000 |
| Dipropylene glycol | 1 | 134 |
| 2-ethoxyethyl acetate | | 681 |
| Xylene | | 681 |

Procedure: Same as in Example 2.

Properties:
    NCO/OH _____ 1.5/1
    Average molecular weight _____ 3186
    Average equivalent weight _____ 796
    Free —NCO, percent _____ 3.64

NCO–3L in urethane surface coatings: When employed as a coatings component either alone or together with the OH-terminated components of Example 2 in the NCO/OH proportions of Example 2, NCO–3L gives hard urethane films which are less flexible but which have greater solvent resistance than the films of Example 2. Chemical resistance and water immersion resistance are excellent.

*Example 11*

(NCO–3M)

| Reactants | Moles | Parts |
|---|---|---|
| Tolylene diisocyanate (70/20; 2, 4/2,6) | 8 | 1,392 |
| Polyoxypropylene derivative of pentaerythritol, 5 PO units/OH group (M.W. 1285) | 2 | 2,570 |
| Dipropylene glycol | 1 | 134 |
| 2-ethoxyethyl acetate | | 1,362 |
| Xylene | | 1,362 |

Procedure: Same as in Example 2.

Properties:
    NCO/OH _____ 1.6/1
    Average molecular weight _____ 4118
    Average equivalent weight/NCO group ____ 668
    Free —NCO, percent _____ 3.62

NCO–3M in urethane surface coatings: When employed as a coatings component either alone or together with the OH-terminated components of Example 2 in the NCO/OH proportions of Example 2, NCO–3M gives hard urethane films which are less flexible but which have greater solvent resistance than the films of Example 2. Chemical resistance and water immersion resistance are excellent.

*Example 12*

(NCO–3N)

| Reactants | Moles | Parts |
|---|---|---|
| TDI (80/20; 2,4/2,6) | 6 | 1,044 |
| Polyoxypropylene derivative of trimethylolpropane, 1 PO unit/OH group (M.W. 300) | 2 | 600 |
| Polypropyleneether glycol, P-410—M.W. 420 | 1 | 420 |
| 2-ethoxyethyl acetate | | 443 |
| Xylene | | 443 |

Procedure: Same as in Example 2.

Properties:
    NCO/OH _____ 1.5/1
    Average molecular weight _____ 2070
    Average equivalent weight _____ 517
    Free —NCO, percent _____ 5.6

NCO–3N in urethane surface coatings: When employed as a coatings component either alone or together with the OH-terminated components of Example 2 in the NCO/OH proportions of Example 2, NCO–3N gives hard urethane films which are less flexible but which have greater solvent resistance than the films of Example 1. Chemical resistance and water immersion resistance are excellent.

*Example 13*

(NCO–3EX)

| Reactants | Moles | Parts |
|---|---|---|
| TDI (80/20; 2,4/2,6) | 6 | 1,044 |
| Addition product of 1 ethylene oxide unit to tri(oxypropylene) derivative of trimethylolpropane (M.W. 350) | 2 | 700 |
| Polypropyleneether glycol, P-410—M.W. 420 | 1 | 420 |
| 2-ethoxyethyl acetate | | 468 |
| Xylene | | 468 |

Procedure: Same as in Example 2.

Properties:
    NCO/OH _____ 1.5/1
    Average molecular weight _____ 2200
    Average equivalent weight _____ 550
    Free —NCO, percent _____ 5.35

NCO–3EX in urethane surface coatings: When employed as a coatings component either alone or together with the OH-terminated components of Example 2 in the NCO/OH proportion of Example 2, NCO–3EX gives hard urethane films which are less flexible but which have greater solvent resistance than the films of Example 2. Chemical resistance and water immersion resistance are excellent.

*Example 14*

(NCO–3AT)

| Reactants | Moles | Parts |
|---|---|---|
| TDI (80/20; 2,4/2,6) | 8 | 1,392 |
| Addition product of one mole of ethylene oxide to one mole of pentaerythritol polypropylene oxide derivative—PE-368T (M.W. 410) | 2 | 820 |
| Polypropylene ether glycol, M.W. 750 | 1 | 750 |
| 2-ethoxyethyl acetate | | 989 |
| Xylene | | 989 |

Procedure: Same as in Example 2.

Properties:
  NCO/OH _____ 1.6/1
  Average molecular weight _____ 2,950
  Average equivalent weight _____ 492
  Free —NCO, percent _____ 5.1

*NCO–3AT in urethane surface coatings:* When employed as a coatings component either alone or together with the OH-terminated components of Example 2 in the NCO/OH proportions of Example 2, NCO–3AT gives hard urethane films which are more flexible but which have less solvent resistance than the films of Example 2. Chemical resistance and water immersion resistance are excellent.

It is of course well known that isocyanates, particularly polyisocyanates, may be reacted with certain reagents to form complexes which are unreactive at room temperature towards moisture or other compounds containing active hydrogen. Therefore, stable one-package systems, clear or pigmented, are possible and may be prepared by mixing the blocked isocyanates with polyols. The free isocyanate groups are liberated from the blocking agent, and the coating cured, by applying heat. This type of system has been found particularly useful in wire coatings. Examples of agents bearing active hydrogens which may be used to form blocked isocyanates are acetoacetic esters, cyclohexanone oxime, and phenol. An especially commercially successful system is prepared by reacting phenol with a non-volatile isocyanate-terminated product. Since a small percentage of free isocyanate is not objectionable in such a product which is to be blocked with phenol, products prepared using mixtures of isomers of isocyanates, for example, an 80/20 mixture of 2,4- and 2,6-tolylene diisocyanate, are entirely satisfactory for blocking with a phenol. Such blocked derivatives of the products of the invention are prepared in the same manner as other blocked isocyanate products, and may be utilized in the same manner, i.e., by restoring reactivity of the blocked isocyanate groups by the application of heat. The phenylurethanes of the products of the invention, produced by the employment of phenol as blocking agent, are especially satisfactory, although others may be used.

It is to be understood that the invention is not limited to the exact details of operation or exact compounds shown and described, as obvious modifications and equivalents will be apparent to one skilled in the art, and the invention is therefore to be limited only by the scope of the appended claims.

We claim:

1. A novel, ordered polyether-based NCO-terminated urethane composition produced by first mixing and reacting about one molar proportion of a polyether polyol ($a$) which is a propylene oxide addition product of a polyhydric lower-aliphatic alcohol having at least three and not more than six hydroxy groups in the molecule, said polyol having on an average at least one and not more than five propylene oxide units per hydroxy group, with about one molar proportion of an arylene diisocyanate ($b$) selected from the group consisting of phenylene diisocyanate, tolylene diisocyanate, and diphenylmethane-4,4'-diisocyanate, for each hydroxy group of the polyether polyol ($a$), to produce an isocyanate-terminated polyether-based urethane intermediate adduct, and then mixing and reacting about two molar proportions of the thus-produced isocyanate-terminated adduct with about one molar proportion of a poly-propyleneether glycol ($c$) having a molecular weight between about 134 and 1000.

2. An ordered isocyanate-terminated urethane composition prepared by first mixing and reacting together about one molar proportion of polyether polyol ($a$), said polyether polyol ($a$) having the formula:

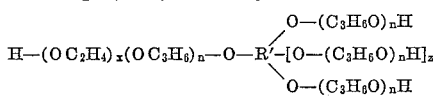

wherein R' with attached oxygen atoms represents the radical of a polyhydric lower-aliphatic alcohol, wherein, $n$ is a number from one to five, inclusive, wherein $z$ is a number from zero to three, inclusive, and wherein $x$ is a number from zero to one, inclusive, with about one molar proportion of arylene diisocyanate ($b$) selected from the group consisting of phenylene diisocyanate, tolylene diisocyanate, and diphenylmethane-4,4'-diisocyanate, for each hydroxy group of the polyether polyol ($a$), to produce an isocyanate-terminated polyether-based urethane intermediate adduct, and then mixing and reacting about two molar proportions of the thus-formed isocyanate-terminated urethane intermediate adduct with about one molar proportion of a polypropyleneether glycol ($c$) having a molecular weight between about 134 and 1000, to produce the desired isocyanate-terminated urethane composition, the initial reaction temperature in the first step of the reaction being not greater than about sixty degrees centigrade.

3. An ordered NCO-terminated urethane composition according to claim 2 wherein the polypropyleneether glycol ($c$) has a molecular weight not greater than about 750 and $n$ does not exceed an average of three.

4. An ordered NCO-terminated urethane composition according to claim 2 wherein the arylene diisocyanate ($b$) is tolylene diisocyanate and the polyether polyol ($a$) is an alkylene oxide addition product of trimethylolpropane.

5. An ordered NCO-terminated urethane composition according to claim 2 wherein the arylene diisocyanate ($b$) is tolylene diisocyanate and the polyether polyol ($a$) is a pentaerythritol alkylene oxide addition product.

6. An ordered NCO-terminated urethane composition according to claim 2 wherein the arylene diisocyanate ($b$) is tolylene diisocyanate and the polyether polyol ($a$) is a hexanetriol alkylene oxide addition product.

7. An ordered NCO-terminated urethane composition according to claim 2 wherein the arylene diisocyanate ($b$) is tolylene diisocyanate and the polyether polyol ($a$) is a glycerine alkylene oxide addition product.

8. An ordered NCO-terminated urethane composition according to claim 1 wherein the average NCO equivalent weight is between about 400 and about 600.

9. A solution of an ordered NCO-terminated urethane composition according to claim 2 in a surface coating solvent which is nonreactive therewith.

10. A urethane coating composition including as one component an ordered NCO-terminated urethane composition according to claim 2 and including an organic hydroxy compound as a second component.

11. A coating composition according to claim 10, including an organic surface coating solvent which is nonreactive with both the components of the coating composition and their polyurethane reaction product.

12. A process for the production of a novel ordered polyether-based NCO-terminated urethane composition, which consists in first mixing and reacting together about one molar proportion of a polyether polyol ($a$) which is a propylene oxide addition product of a polyhydric lower-aliphatic alcohol having at least three and not more than six hydroxy groups in the molecule, said polyol having on an average at least one and not more than five propylene oxide units per hydroxy group, with about one molar proportion of an arylene diisocyanate ($b$) selected from the group consisting of phenylene diisocyanate, tolylene diisocyanate, and diphenylmethane-4,4'-diisocyanate, for each hydroxy group of the polyether polyol ($a$), to produce an isocyanate-terminated polyether-based urethane intermediate adduct (I), and then mixing and reacting about two molar proportions of the thus-produced isocyanate-terminated adduct (I) with about one molar proportion of a polypropyleneether glycol (c) having a molecular weight between about 134 and 1000.

13. A process for the sequential production of an ordered isocyanate-terminated urethane composition which comprises first mixing and reacting together about one molar proportion of polyether polyol (a), said polyether polyol (a) having the formula:

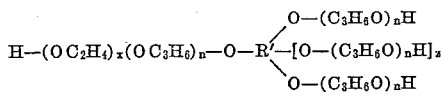

wherein R' with attached oxygen atoms represents the radical of a polyhydric lower-aliphatic alcohol, wherein $n$ is a number from one to five, inclusive, wherein $z$ is a number from zero to three, inclusive, and wherein $x$ is a number from zero to one, inclusive, with about one molar proportion of arylene diisocyanate (b) selected from the group consisting of phenylene diisocyanate, tolylene diisocyanate, and diphenylmethane-4,4'-diisocyanate, for each hydroxy group of the polyether polyol (a) to produce an isocyanate-terminated polyether-based urethane intermediate adduct, and then mixing and reacting about two molar proportions of the thus-produced isocyanate-terminated urethane intermediate adduct with about one molar proportion of a polypropyleneether glycol (c) having a molecular weight between about 134 and 1000, to produce the desired ordered isocyanate-terminated urethane composition, the initial reaction temperature in the first step of the reaction being not greater than about sixty degrees centigrade.

14. A process for producing an ordered NCO-terminated urethane composition according to claim 13, wherein the polypropyleneether glycol (c) has a molecular weight not greater than about 750 and $n$ does not exceed an average of three.

15. A process for producing an ordered NCO-terminated urethane composition according to claim 13, wherein the arylene diisocyanate (b) is tolylene diisocyanate and the polyether polyol (a) is an alkylene oxide addition product of trimethylolpropane.

16. A process for producing an ordered NCO-terminated urethane composition according to claim 13, wherein the arylene diisocyanate (b) is tolylene diisocyanate and the polyether polyol (a) is a pentaerythritol-alkylene oxide addition product.

17. A process for producing an ordered NCO-terminated urethane composition according to claim 13, wherein the arylene diisocyanate (b) is tolylene diisocyanate and the polyether polyol (a) is a glycerine-alkylene oxide addition product.

18. A process for producing an ordered NCO-terminated urethane composition according to claim 13, wherein the arylene diisocyanate (b) is tolylene diisocyanate and the polyether polyol (a) is a hexanetriol-alkylene oxide addition product.

References Cited in the file of this patent

UNITED STATES PATENTS

| | | |
|---|---|---|
| 2,866,774 | Price | Dec. 30, 1958 |
| 2,897,181 | Windemuth | July 28, 1959 |

FOREIGN PATENTS

| | | |
|---|---|---|
| 205,456 | Australia | Jan. 4, 1957 |
| 733,624 | Great Britain | July 13, 1955 |
| 769,091 | Great Britain | Feb. 27, 1957 |

UNITED STATES PATENT OFFICE

CERTIFICATE OF CORRECTION

Patent No. 3,049,513                                                     August 14, 1962

Adolfas Damusis et al.

It is hereby certified that error appears in the above numbered patent requiring correction and that the said Letters Patent should read as corrected below.

Column 1, line 18, after "along" insert -- with --; line 60, for "$T_1$ i" read -- $T_1$ is --; column 6, line 53, after "parts" insert -- of --; column 8, line 15, in the formula "O" should be a circle; column 11, line 33, after "the", second occurrence, insert -- NCO/OH proportions of Example 2, --; same column 11, Example 11, in the table, first column, line 1 thereof, for "70/20" read -- 80/20 --; column 12, line 4, for "668" read -- 686 --.

Signed and sealed this 16th day of April 1963.

(SEAL)
Attest:

ERNEST W. SWIDER                                        DAVID L. LADD
Attesting Officer                                            Commissioner of Patents